United States Patent [19]

Bryzek

[11] 4,196,382
[45] Apr. 1, 1980

[54] PHYSICAL QUANTITIES ELECTRIC TRANSDUCERS TEMPERATURE COMPENSATION CIRCUIT

[75] Inventor: Janusz Bryzek, Warsaw, Poland

[73] Assignee: Predsiqbiorstwo Auttomatyki Przemyslowej "Mera-Pnefal", Warsaw, Poland

[21] Appl. No.: 878,380

[22] Filed: Feb. 16, 1978

[30] Foreign Application Priority Data

Feb. 18, 1977 [PL] Poland .................................. 196115

[51] Int. Cl.² .......................... G01L 1/22; G01K 7/20
[52] U.S. Cl. .................................... 323/75 A; 73/726; 323/75 B
[58] Field of Search ............... 73/727, 726; 323/75 A, 323/75 B

[56] References Cited

U.S. PATENT DOCUMENTS

| | | | |
|---|---|---|---|
| 3,188,553 | 6/1965 | Eurenius | 323/75 A |
| 3,278,834 | 10/1966 | Perino | 323/69 |
| 3,495,159 | 2/1970 | Smith | 323/69 |
| 3,887,864 | 6/1975 | Knudsen | 323/75 A |

Primary Examiner—A. D. Pellinen
Attorney, Agent, or Firm—Haseltine, Lake & Waters

[57] ABSTRACT

A physical quantities transducer compensation circuit is provided with at least two compensating bridge circuits. The first of these circuits consists of resistors and a first potentiometer and thermistors where the control element, preferably a second potentiometer is connected via the diagonal of this bridge supplied by the voltage drop across a resistor connected in series into the current circuit of a strain gauge. The current circuit of the second strain gauge includes a zeroing circuit consisting of resistors and a third potentiometer. The second compensating bridge is built of resistors and thermistators, and a fourth potentiometer is connected over the diagonal of the bridge. This bridge is supplied with the differential voltage of a Zener diode having a resistor and a diode supplied with the bridge current. The current source is located on the transistors and the resistor being controlled by voltage between the slide of a fourth potentiometer and the common point, to which diode and resistor are connected. Supply current sources of the strain gauges and the output signal is taken from slides of a second and third potentiometers.

6 Claims, 1 Drawing Figure

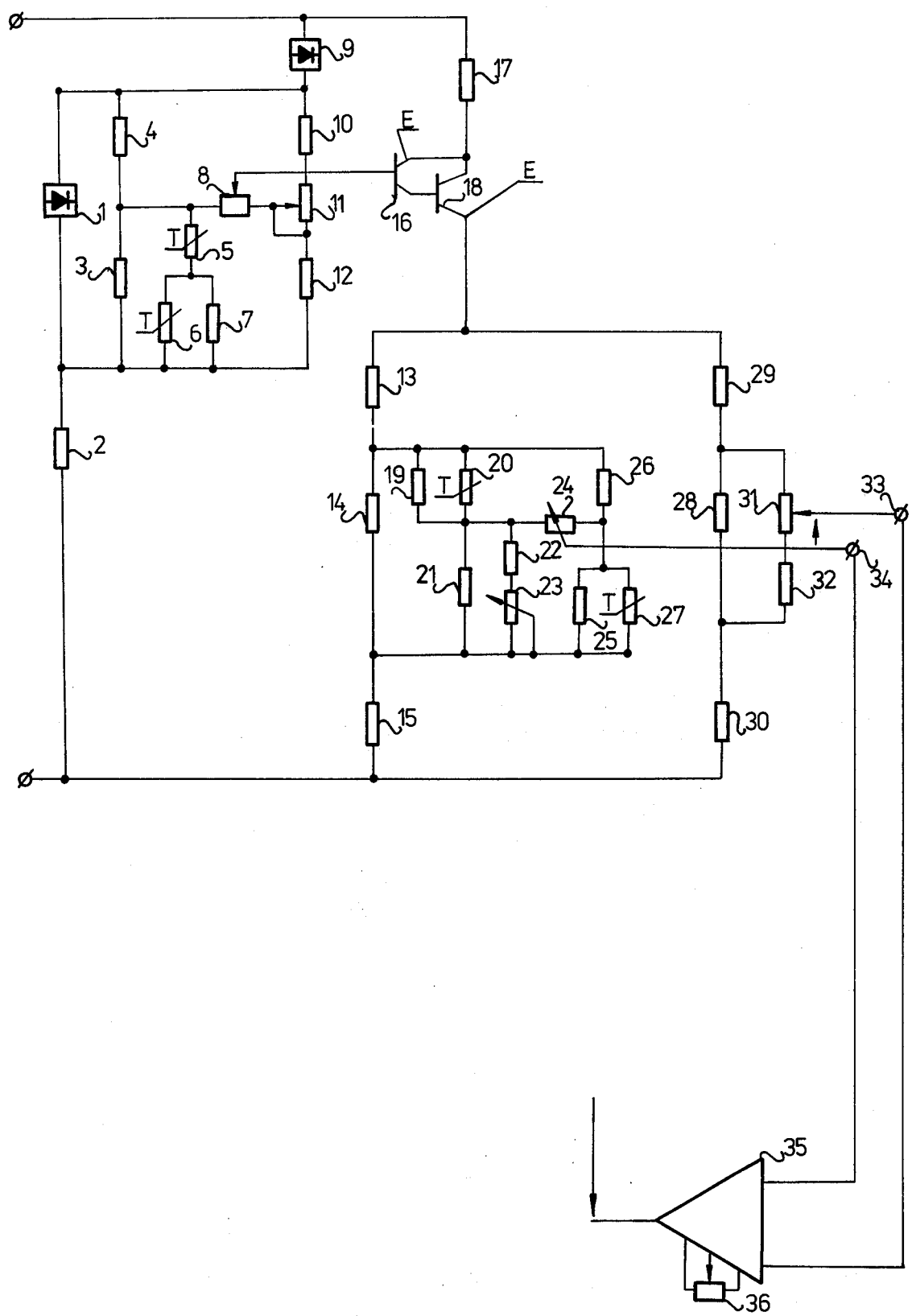

PHYSICAL QUANTITIES ELECTRIC TRANSDUCERS TEMPERATURE COMPENSATION CIRCUIT

BACKGROUND OF THE INVENTION

The subject of the invention is a temperature compensation circuit in electric transducers of physical quantities.

Various systems have been used for temperature compensation of electric transducers of physical quantities. Most similar to our invention is the circuit presented in U.S. Pat. No. 3,654,545.

Other circuits are presented in the U.S. Pat. Nos. 3,278,834, 3,886,799 and 3,646,815.

The essence of the invention according to U.S. Pat. No. 3,654,545 consists in the application of resistance-thermistor two-terminal networks included in the circuit of a bridge containing strain gauges aimed at the compensation of the zero shift and in the use of a thermistor-resistance two-terminal network connected to the control circuit for current supply of the meassuring bridge in order to compensate the span shift. Similar design not containing the current source has been applied in U.S. Pat. No. 3,278,834. In U.S. Pat. No. 3,546,815 there have been used single resistance elements for zero shift compensation and a thermistor-resistance two-terminal network compensation controlling the current sources supplying the strain gauges for span shift. In U.S. Pat. No. 3,886,799 there have been used single resistors connected in parallel to the strain gauges for zero shift compensation and a voltage source depending on temperature on a transistor diffused—near to the strain gauges connected in series with the bridge—for the span shift compensation.

In order to determine parameters of the compensating elements according to the known methods, either digital computers must be used for calculation of the temperature characteristics or complicated testers must be applied, since the parameters of components used are interrelated with one another. Manufacture of these elements to special order or provision of an appropriate number of spare elements is troublesome.

The aim of the invention is to provide a simple and effective temperature compensation system in the electric physical quantities transducers eliminating the necessary selection of special elements and rendering possible use of the system for the compensation of different transducers.

SUMMARY OF THE INVENTION

The essence of the invention consists in the application of a bridge system for each parameter requiring the temperature compensation for example, zero or span. In the bridge branches there are included the temperature sensitive elements having the same temperature as the gauge. Via the diagonal of the bridge there is introduced the potentiometer control element. Voltage appearing on this element is a function of temperature and can be equal to zero for one value of temperature in the case of equilibrium of the bridge. At this temperature, the potential of the potentiometer slide wiper is constant and independent of the position, of the slide. For any other temperature, the voltage over the diagonal of the bridge system is not equal to zero. In consequence, the potential of the slide is a function of its position. Addition of the voltage of the potentiometer slide to the signal of the gauge allows complete elimination of the influence of temperature in the resultant signal for the two following temperatures:

For temperature $T_1$ by means of a control of equilibrium of the bridge circuit irrespective of the position of the potentiometer slide as well as for temperature $T_2$—by means of changing the position of the slide.

BRIEF DESCRIPTION OF THE DRAWING

A schematic diagram showing a circuit arrangement of an embodiment of the present invention.

DESCRIPTION OF THE PREFERRED EMBODIMENTS

The circuit according to the invention of the transducer of non-electric values includes two strain gauges: strain gauge 15 whose resistance increases with an increase of the value being measured and strain gauge 30 wherein an increase in the values being measured is followed by a decrease in resistance.

The circuit is supplied from a voltage source connected to the terminals. The differential output signal is taken from terminals 33 and 34.

In the described circuit, temperature effect must be compensated on the initial point of the calibration curve and on the slope of calibration curve. To this end two bridge compensating circuits have been used. The first of them consists of resistors 26, 19, 21, 22 and 25 and potentiometer 23 as well as thermistors 20 and 27. The temperature coefficient is controlled by means of potentiometer 24 included in the diagonal of this bridge. The bridge is supplied by the voltage drop across resistor 14 connected in series in the current circuit of the strain gauge 15.

The current circuit of the strain gauge 30 includes a zeroing circuit consisting of resistors 32 and potentiometer 31. The basic measuring bridge is fitted with additional resistors 13 and 29. The measuring bridge is supplied with current source via transistors 16 and 18 and resistor 17. The voltage controlling current of the current source is obtained by means of the second compensating bridge consisting of resistors 4, 10, 3, 7, 12, thermistors 5, 6 and potentiometer 11. The temperature coefficient is controlled by means of potentiometer 8 connected over the diagonal of the bridge. This bridge is supplied with the voltage of Zener diode 1 supplied through resistor 2. Diode 9 compensates the thermal drift of the base-amitter junction of transistor 16. The output signal of the measuring bridge is amplified by a differential amplifier 35 with gain adjustable by means of potentiometer 36.

Compensation consists in the first step in setting the zero voltage on potentiometer 24 at the temperature $T_1$ at the initial value of the parameter being measured and then setting the zero output voltage across the terminals 33, 39 of potentiometer 31. In this condition, the output voltage will be always equal to zero independent of the bridge supply current. At the same temperature, zero voltage is set on potentiometer 8 by means of potentiometer 11 and sensitivity of the transducers is being messured, the full range value by means of potentiometer 36. Having changed the temperature one should again set the zero output voltage across the terminals 33, 34 at the initial value of the parameter being measured by means of potentiometer 24 and bring the sensitivity of the transducer to the previous value by means of potentiometer 8.

In accordance with the present invention, therefore, an additional bridge is provided which produces a signal of temperature compensation to compensate for zero drift and to control the source of the current supplying the measurement bridge by another bridge producing a signal compensating temperature range drift. The voltage on the compensating bridges are equal to zero at standard temperature; the potential of the potentiometer slides (wipers) placed across the diagonal of the bridges depend upon such zero setting. At the temperature of the first compensation, the potential of the slides is the function of such zero setting, permitting compensation of the gauge's losses, without changing the zero value and the standard temperature range.

Accordingly, the present invention includes two basis bridges. The first bridge consisting of components 19, 20, 21, 22, 23, 25, 26, 27 together with shunt resistor 14 is connected in series with two arms (components 13 and 15) of measuring bridge and not in series with measuring bridge, as it was done in the patent to Eurenius.

The present invention has also a possibility of correction of components tolerance at reference temperature (by means of potentiometer 23) and correction of characteristic of temperature sensors 20 and 27 (by means of resistors 19 and 25).

At reference temperature, both voltages: across potentiometer 24 (connected across the diagonal of zero-compensating bridge) and across potentiometer 8 (connected across the diagonal of span compensating bridge) are equal to zero. When the lower range value of measured quantity (for instance pressure) is applied, potentiometer 31 allows zeroing the voltage difference between points 33 and 34 of measuring bridge, independently of a value of emitter of transistor 18 current supplying the measuring bridge.

When, in turn, upper range value of measured quantity is applied at reference temperature, there is a possibility to adjust measuring bridge supply current in order to obtain required upper range output signal. This is done by properly setting potentiometer 8 potential, resistor 17 resistance value and setting of amplifier 35 gain by potentiometer 36.

At compensation temperature, again lower range value of measured quantity is applied. Since now a compensating voltage across potentiometer 24 is generated by the compensating bridge, there is a possibility to zero the voltage difference between points 33 and 34 by means of adjusting a position of potentiometer 24 slider.

When at this temperature upper range the value of the measured quantity is applied again, changing the measuring bridge current does not change the balance of the measuring bridge. Since the compensating voltage across potentiometer 8 is now generated, its slider is used to set required upper range output signal.

This procedure makes sure at two temperatures, reference and compensation, the output transducer signal has the same value for both upper and lower range values of measured quantity. If the temperature shifts of both lower and upper range value would be proportional (linear) to the ambient temperature then linear transducer characteristic would be perfectly compensated. If these temperature shifts are not linear with temperature, then only non-linear components will cause the resultant transducer temperature error; however, at compensation temperature there will be no error.

I claim:

1. A temperature compensating arrangement of electrical transducers of physical quantities with the application of resistors, strain gauges and thermistors, said arrangement comprising: at least two compensating bridge circuits; a first one of said bridge circuits having first resistor means, first potentiometer means and first thermistor means, a first control element connected across a diagonal of said first bridge circuit; voltage divider means for supplying voltage to said first bridge circuit, said voltage divider means having a resistor across said first bridge circuit; a first strain gauge connected in series with said resistor of said voltage divider means; a second strain gauge; a zeroing circuit connected to said second strain gauge, said zeroing circuit allowing zeroing of voltage difference between outputs of said first bridge circuit when a lower range value of measured physical quantity is applied allowing second bridge circuit supply current adjustment for required upper range output signal when an upper range value of measured physical quantity is applied, said second strain gauge being in said first bridge circuit; a second compensating bridge circuit having second resistor means, second potentiometer means and a second control element connected across a diagonal of said second bridge circuit; a Zener diode connected in series with a resistor for supplying voltage to said first bridge circuit; a current source connected to said first and second bridge circuits; auxiliary diode means connected between said current source and said second bridge circuit; and output potentiometer means for providing an output signal from said first bridge circuit.

2. A temperature compensating arrangement as defined in claim 1, wherein said first and second control elements comprise potentiometer means.

3. A temperature compensating arrangement as defined in claim 1, wherein said zeroing circuit comprises resistor means.

4. A temperature compensating arrangement as defined in claim 1, wherein said current source comprises transistor means and a resistor.

5. A temperature compensating arrangement as defined in claim 1, wherein said output potentiometer means comprises first and second output potentiometers.

6. A temperature compensating arrangement as defined in claim 1, including amplifier means connected to said output potentiometer means for amplifying the output signals.

* * * * *